(12) United States Patent
Beyda et al.

(10) Patent No.: US 6,549,569 B1
(45) Date of Patent: Apr. 15, 2003

(54) SYSTEM AND METHOD FOR IMPROVING CONVERSION BETWEEN A-LAW AND U-LAW CODING

(75) Inventors: William J. Beyda, Cupertino, CA (US); Shmuel Shaffer, Palo Alto, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/289,355

(22) Filed: Apr. 9, 1999

(51) Int. Cl.[7] .................. H04B 1/38; H04L 5/16
(52) U.S. Cl. ............... 375/222; 375/241; 375/242; 375/243
(58) Field of Search ............... 375/222, 220, 375/245, 242, 241, 243; 370/466

(56) References Cited

U.S. PATENT DOCUMENTS

| | | | |
|---|---|---|---|
| 4,518,950 A | 5/1985 | Petr | 340/34 |
| 4,610,018 A | 9/1986 | Rabaey et al. | 375/25 |
| 4,661,946 A * | 4/1987 | Takahashi et al. | 370/58 |
| 4,819,253 A | 4/1989 | Petruschka | 375/30 |
| 4,912,758 A | 3/1990 | Arbel | 379/388 |
| 5,195,132 A | 3/1993 | Bowker et al. | 379/410 |
| 5,528,595 A | 6/1996 | Walsh et al. | 370/85 |
| 5,652,782 A * | 7/1997 | Hughes-Hartogs | 379/27 |
| 5,671,251 A | 9/1997 | Blackwell et al. | 375/222 |
| 5,812,075 A | 9/1998 | Betts et al. | 341/94 |
| 5,832,240 A | 11/1998 | Larsen et al. | 395/285 |
| 5,835,578 A | 11/1998 | Reyes et al. | 379/93.29 |
| 5,883,925 A | 3/1999 | Sinibaldi et al. | 375/241 |
| 6,111,935 A * | 8/2000 | Hughes-Hartogs | 379/27 |

* cited by examiner

*Primary Examiner*—Mohammad H. Ghayour (57) ABSTRACT

A modem or other telephone device (102, 502) is configured to identify (or receive notification of) the companding law used by a destination modem or telephone device. The telephone device (102, 502) can then, using stored conversion tables, predict the inverse mapping from the converted encoding law. Having done so, the telephone device (102, 502) can identify distorted portions of the decoded signal and modify the original signal before it is sent to the encoding or encoding-converter unit.

20 Claims, 5 Drawing Sheets

Orig. Bit Stream

FIG. 1A

μ-Law

SYSTEM AND METHOD FOR IMPROVING CONVERSION BETWEEN A-LAW AND U-LAW CODING

BACKGROUND OF THE INVENTION

The present invention relates to telecommunications systems and, particularly, to an improved method for converting signals between A-law and µ-law format.

It is conventional in telecommunication systems to digitize voice signals according to a predetermined encoding law. Currently, there are two international standards for encoding pulse code modulated (PCM) signals. In the United States and Japan, µ-law encoding is used; in Europe and the rest of the world, A-law encoding is used. Both standards are promulgated by the International Telecommunications Union (ITU) Telecommunication Standardization Sector in the ITU-T Recommendation G.711, which is hereby incorporated by reference in its entirety as if fully set forth herein.

When a call is placed between countries using different PCM encoding schemes, the network must provide conversion through the use of a device that converts µ-law to A-law and A-law to µ-law. Typically, the device maintains a map or look-up table to perform the conversion. Such maps are defined at Tables 3 and 4 of the Recommendation G.711. The nature of the encoding, however, is such that distortion may nevertheless result when the signals are decoded.

Figure 1A:
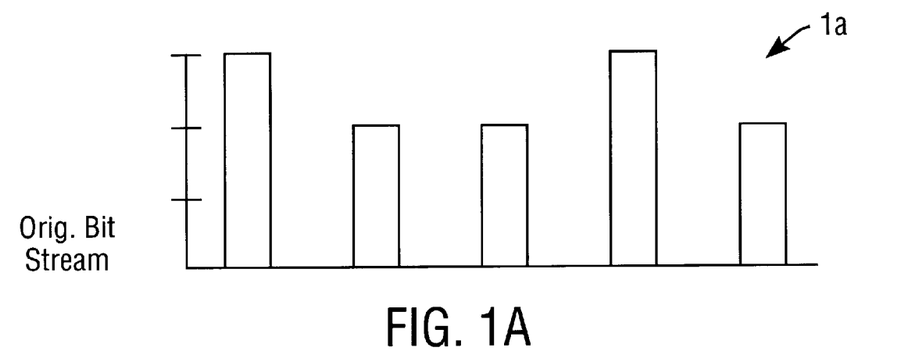
FIGS. 1A–1C are diagrams illustrating the conversion of an exemplary wave form after µ-law and A-law coding.
Figure 1B:
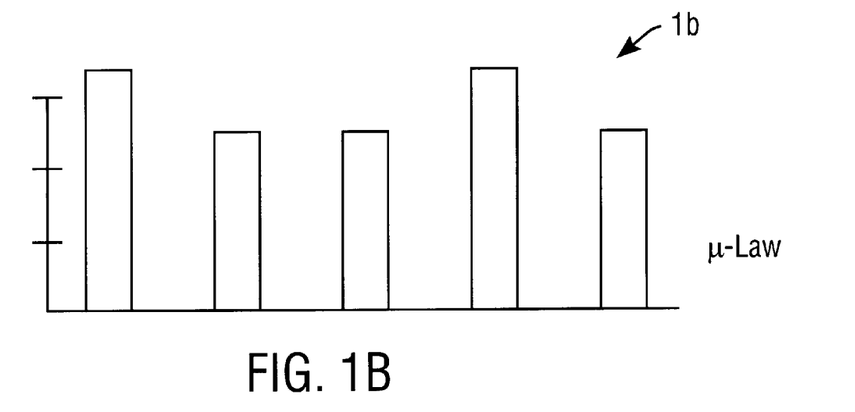
Figure 1C:
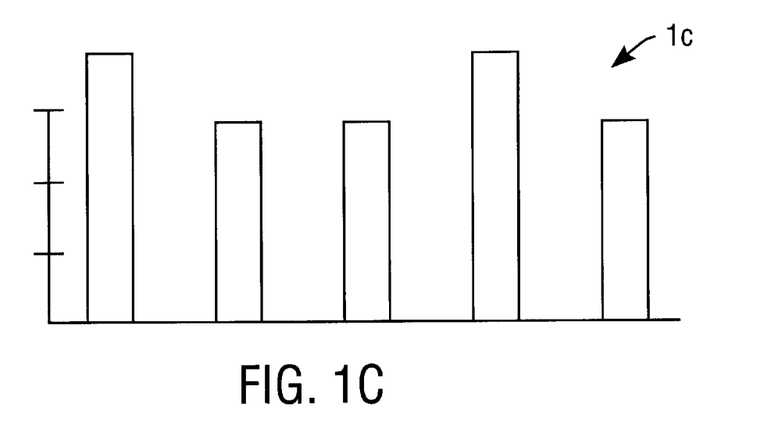

For example, FIG. 1A illustrates an exemplary digitized voice wave form 1a that is to be sent from a starting location that uses µ-law PCM encoding. When µ-law converted, the digitized voice wave form 1a may take on values (represented by the waveform 1b of FIG. 1B) that are slightly higher than in the original wave form. At the destination location that uses A-law PCM encoding scheme, the µ-law converted wave form is then converted to A-law format. The A-law converted wave form may take on values (as shown in the waveform 1c of FIG. 1C) that are even higher than in either the µ-law converted wave form or the original wave form. The A-law converted wave form 1c is then A-law decoded, and these cumulative changes in the wave form values due to the µ-law and A-law conversion can ultimately lead to distortion. Similarly to the above example except in reverse, there can be distortion when a signal wave form is received when sent from a starting location that uses A-law coding to a destination location that uses µ-law coding. This type of signal distortion is only an annoyance when dealing with voice signals, but the distortion when dealing with data signals can impair the receiving modem's ability to demodulate accurately.

Thus, there is a need for improved µ-law to A-law conversion and A-law to µ-law conversion, both for data and voice communications.

SUMMARY OF THE INVENTION

These and other disadvantages in the prior art are overcome in large part by a system and method according to the present invention. A modem or other telephony device is configured to identify (or receive notification of) the companding law used by a destination modem or telephony device. The telephony device can then, using stored conversion tables, predict the inverse mapping from the converted encoding law. Having done so, the telephony device can identify distorted portions of the decoded signal and modify the original signal before it is sent to the encoding or encoding-converter unit.

A telephony-over-LAN (ToL) client according to an embodiment of the invention includes a digital signal processor (DSP) and a memory for storing A-law and µ-law maps. The ToL client receives an identification from its gatekeeper of the companding law used by the destination. The ToL client then optimizes the signal for that law. Thus, the ToL client may generate a different, optimized amplitude digital signal if the destination uses a different companding law than the ToL client's location does.

A modem according to an embodiment of the invention similarly is configured to identify the destination device's encoding law. The modem may then adjust its output analog signal (either directly or by adjusting the input digital signal) to "trick" the central office or PBX into choosing a different signal level (different than the signal level resulting normally without use of the invention) when it converts.

These and other embodiments will be better understood from the following detailed description in conjunction with the following drawings.

DETAILED DESCRIPTION OF THE INVENTION

Figure 2:
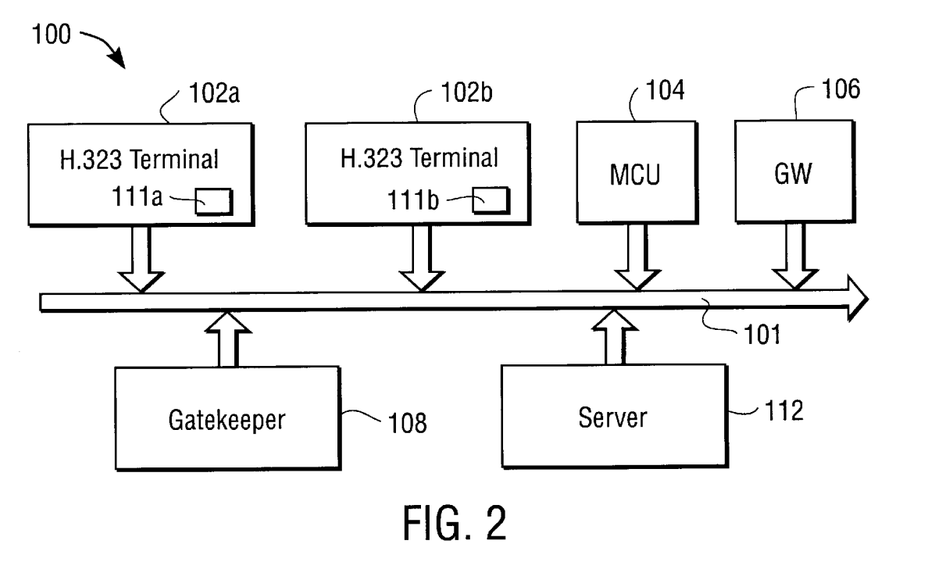
FIG. 2 is a diagram illustrating an H.323 system according to an embodiment of the invention.

Turning now to the drawings, and with particular attention to FIG. 2, a diagram illustrating a telecommunications system 100 according to an embodiment of the present invention is shown. The telecommunications system 100 is a telephony-over-LAN (ToL) system, of the type set forth in the ITU Recommendation H.323. The telecommunications system 100 thus includes a local area network (LAN) or packet network 101. Coupled to the LAN 101 may be a variety of H.323 terminals 102a, 102b, a multipoint control unit (MCU) 104, an H.323 gateway 106, an H.323 gatekeeper 108, a LAN server 112 and a plurality of other devices such as personal computers (not shown).

The H.323 terminals 102a, 102b are in compliance with the H.323 standard. Thus, the H.323 terminals 102a, 102b support H.245 for negotiation of channel usage, Q.931 for call signaling and call setup, registration admission status (RAS), and RTP/RTCP for sequencing audio and video packets. The H.323 terminals 102a, 102b may further implement audio and video codecs, T.120 data conferencing protocols and MCU capabilities. H.323 terminals 102a, 102b may be telephony-enabled computers or digital H.323 telephones.

The H.323 gateway 106 generally provides a translation function between H.323 conferencing endpoints and other terminal types, and performs call setup and clearing on both the LAN side and switched circuit network side.

The H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing.

According to a specific embodiment of the present invention, the gatekeeper 108 may also be configured to identify the coding scheme of the called destination and forward this information to the H.323 terminal 102. The gatekeeper 108 may then communicate the required coding information to the H.323 terminals using RAS messaging. The H.323 terminal 102 then analyzes the incoming audio data to determine if an adjustment is necessary. In other specific embodiments, as will be discussed in greater detail below, the H.323 terminals 102*a*, 102*b* themselves identify (from the country code) the encoding scheme of the destination. The H.323 terminals 102*a*, 102*b* further include coding resources units 111*a*, 111*b* in accordance with various embodiments. The coding resources units 111*a*, 111*b* are configured to identify (or be informed of by the gatekeeper 108) the coding scheme used at a called destination. The coding resources units 111*a*, 111*b* then access $\mu$-law and A-law maps to determine whether the converted and decoded signal at the called destination would be relatively free of distortion. If not, then the incoming digitized voice signal received from the audio I/O of the terminal at the calling destination is adjusted prior to transmission from the terminal, so that the ultimately decoded signal at the called destination is a closer approximation to the incoming digitized voice signal.

Figure 3:
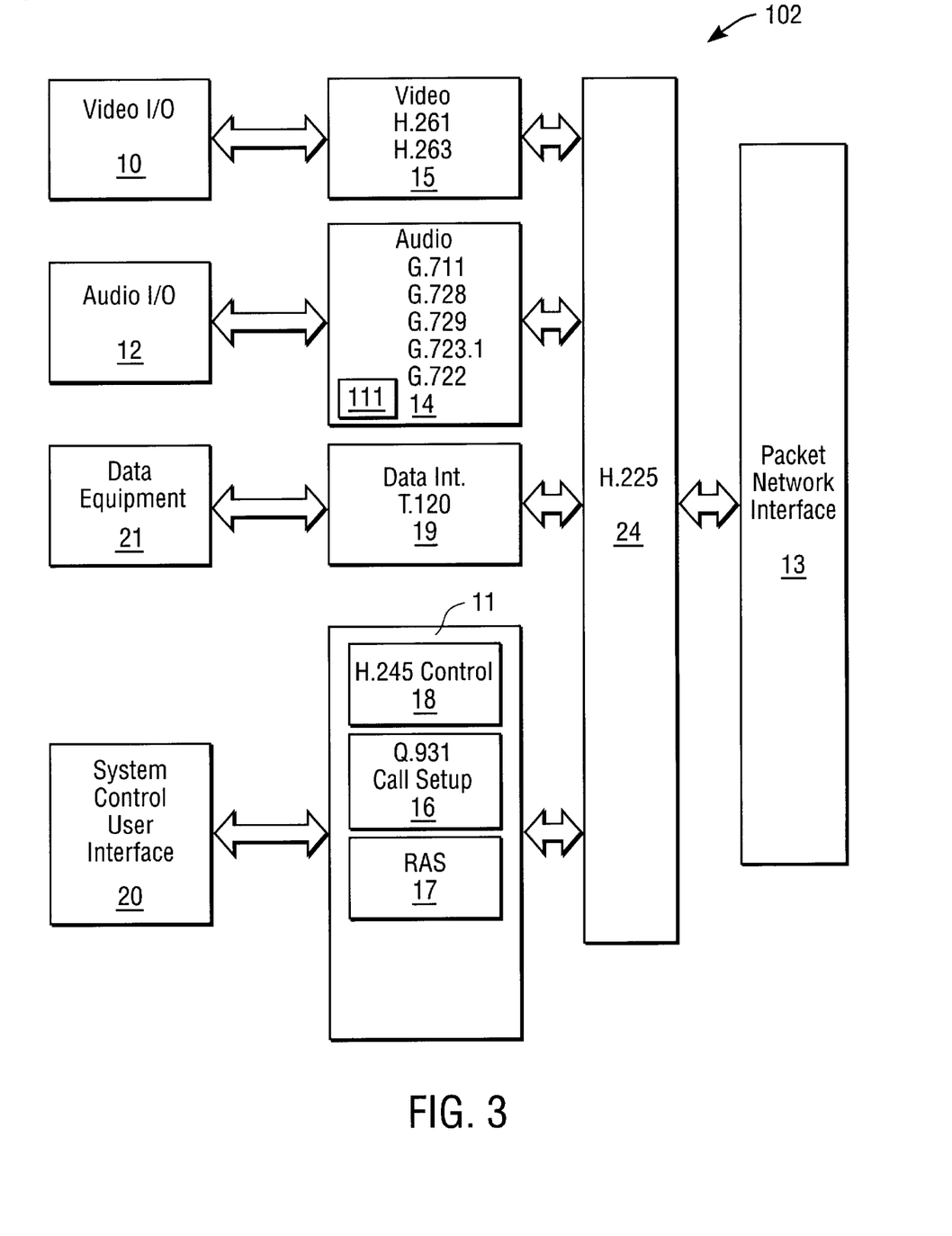
FIG. 3 is a block diagram illustrating an H.323 terminal according to an embodiment of the invention.

A logical diagram of an H.323 interface 102 to LAN 101 is shown in FIG. 3, according to an embodiment of the present invention. Packet network interface 13 couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal 102 includes a video input/output (I/O) interface 10, an audio I/O interface 12, a user application interface 19 (e.g., data interface for connecting to data equipment 21), and a system control user interface (SCUI) 20. Terminal 102 also includes an H.225 layer 24, a video coder/decoder (codec) 15, an audio codec 14, and a control layer 11 that includes Q.931 protocol functionality 16, RAS protocol functionality 17 and H.245 protocol functionality 18.

As seen in FIG. 3, video I/O interface 15 connects to the video codec 15 such as an H.261 codec for encoding and decoding video signals. Coupled between video I/O interface 10 and H.225 layer 24, video codec 15 translates encoded video signals to H.225 protocol signals. Although the H.261 codec can be the video codec used for an H.323 terminal, other video codecs, such as H.263 codecs and others, may also be used for encoding and decoding video.

As shown, audio 110 interface 12 connects to the audio codec 14, such as a G.711 codec, for encoding and decoding audio signals. Coupled to audio I/O interface 12, audio codec 14 is coupled to H.225 layer 24 and translates audio signals to H.225 protocol signals. Although the G.711 codec is the mandatory audio codec for an H.323 terminal, other audio codecs, such as G.728, G.729, G.723.1, G.722, MPEG1 audio, etc. may also be used for encoding and decoding speech. G.723.1 is a preferred codec because of its reasonably low bit rate, which enables preservation of link bandwidth, particularly in slower speed network connections.

As will be discussed in greater detail below, audio codec 14 includes the coding resources unit 111 includes a memory for storing $\mu$-law to A-law and A-law to $\mu$-law conversion maps in accordance with the present invention. When a signal is received from audio I/O 12, the coding resources unit 111 determines whether a coding conversion is required; if so, the coding resources unit 111 adjusts the input signal so that the encoded signal sent from terminal 102 that is decoded at the destination location is optimized to be closer to the original input signal from audio I/O 12.

SCUI 20 provides signaling and flow control for proper operation of the H.323 terminal. In particular, all non-audio and non-video control signaling is handled by SCUI 20. Coupled to SCUI 20 are H.245 layer 18, Q.931 layer 16 and RAS layer 17, which each couple to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. The H.225 standard layer 24, which is derived from the Q.931 standard, is the protocol for establishing connection between two or more H.323 terminals and also formats the transmitted video, audio, data and control streams into messages for output to the network interface 13 (e.g., transport over IP network 101). The H.225 layer 24 also retrieves the received video, audio, data and control streams from messages that have been input from network interface 13. User application interface 19, which may be a T.120 protocol interface as well as other types of protocol interfaces, also couples to H.225 layer 24.

Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone. The terminal may also implement supplementary services according to the H.450 protocol specification.

Figure 4:
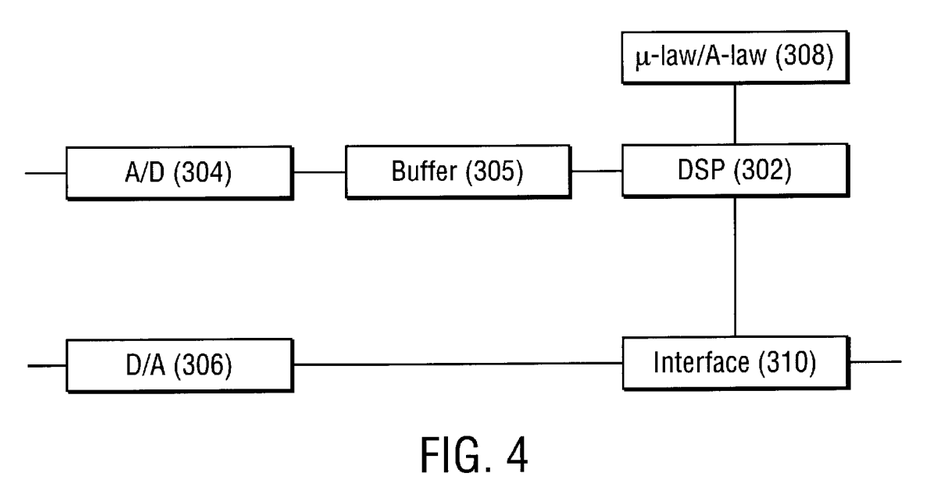
FIG. 4 is a block diagram of an exemplary codec and coding resource unit for the H.323 system of FIG. 2.

Turning now to FIG. 4, a block diagram of an exemplary coding resources unit 111 with a codec of the H.323 terminal is shown. In particular, the coding resource unit 111 includes an analog-to-digital converter 304 coupled to receive and digitize audio input, and a digital-to-analog converter 306 coupled to receive digitized audio input and output analog audio output. The digitized audio input may be provided to a buffer 305 and then to a digital signal processor (DSP) 302. The DSP 302 in turn is coupled to a memory 308 which stores $\mu$-law and A-law conversion maps. The DSP 302 is configured to convert the digitized data stream into a $\mu$-law or A-law encoded data stream, depending on the coding scheme of the country in which the H.323 terminal is located.

According to the present invention, when a call is being made (or received) the DSP 302 may identify the companding or coding scheme at the location of the remote party from call set-up information. In the case of making a call, the DSP 302 may identify the country code and is able to proceed on that basis. In the case of a received call, the DSP 302 receives a signal (e.g., RAS) from the gatekeeper 108 identifying the remote location of the caller as using $\mu$-law or A-law coding in the standard fashion.

After determining if the coding scheme of the remote location is different from the scheme used in the location of the H.323 terminal, the DSP 302 then analyzes the digitized audio input data by determining what the decoded signal will look like. For example, assuming the H.323 terminal is located at a $\mu$-law site, the DSP 302 of the H.323 terminal may accept the digitized input data stream, then determine what A-law input is required to achieve that same digitized audio data stream (e.g., by accessing the appropriate inverse conversion from the memory) as A-law output at the remote location. The A-law input is the output of the $\mu$-law coding; the DSP 302 will then determine, again by accessing the memory, what $\mu$-law input values are most likely to give those $\mu$-law output values. If the original digitized input data stream values do not correspond to the determined $\mu$-law encoder input values, then DSP 302 will adjust the incoming digitized data stream to conform to the determined $\mu$-law encoder input values. Therefore, the $\mu$-law output values of the determined encoded adjusted data stream will be transmitted to the remote location where it should be converted to the other coding scheme (A-law) in the usual manner and A-law decoded into audio output without the typical signal distortion conventionally experienced without use of the present invention. That is, the audio output at the remote location should be a non-distorted reproduction of the input audio of the H.323 terminal.

If the remote location is determined to use the same PCM coding scheme as the location of the H.323 terminal, then DSP 302 is configured to merely convert the digitized data stream into this PCM coding scheme and then to send the encoded data stream via interface 310 for transmission to the remote location.

Therefore, the present invention provides the capability intelligent adjustments of the encoded digitized data stream transmitted to a remote location depending on whether the coding schemes of the communicating locations differ, so that the signal distortion due to coding conversions is significantly reduced.

Figure 5:
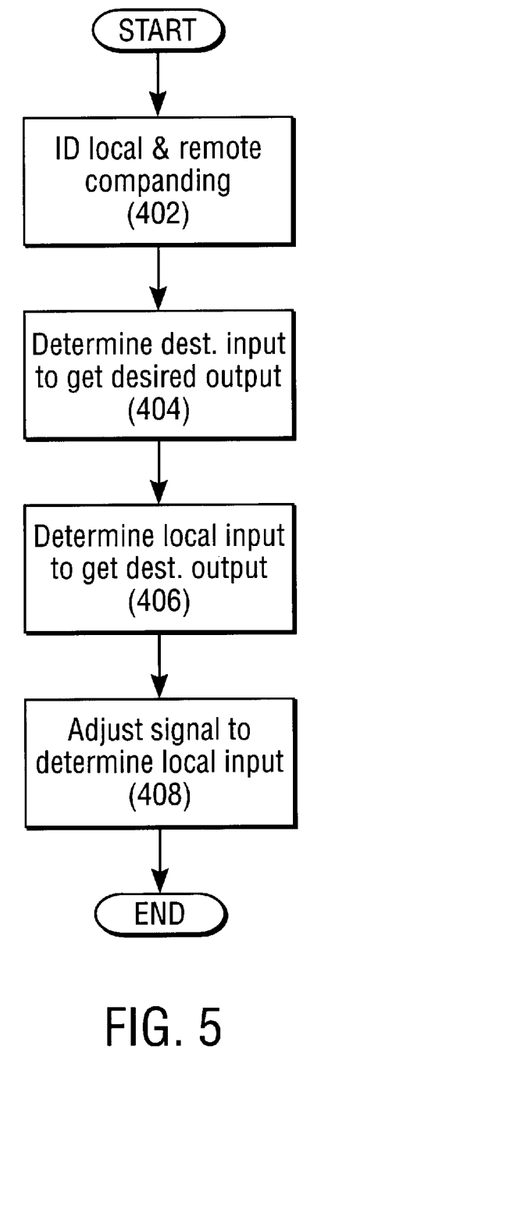
FIG. 5 is a flowchart illustrating operation of the embodiment of FIG. 2.

This process is illustrated in flowchart form in FIG. 5. In a step 402, a call is connected and the local and remote companding schemes are identified. More particularly, in the case of a call being made, the country code may used to identify that an alternative companding scheme is in use (for example, a table of country codes may be maintained in memory). If a call is being received, the gatekeeper 108 identifies the source and provides information to the H.323 terminal of the remote companding scheme. In a step 404, the memory is accessed and the input digital stream is analyzed to determine what input to an A-law decoder will result in the desired output (assuming the local site is $\mu$-law). In a step 406, this A-law input is compared with the $\mu$-law memory map to determine what $\mu$-law input will achieve the desired output. In a step 408, the DSP 302 will adjust the incoming digital stream such that the desired output is arrived at (i.e., to match the determined $\mu$-law input). It is noted that, while illustrated as being embodied in a ToL system, any digital telephony system may make use of the scheme of the present invention. Thus, the figures are exemplary only.

Figure 6:
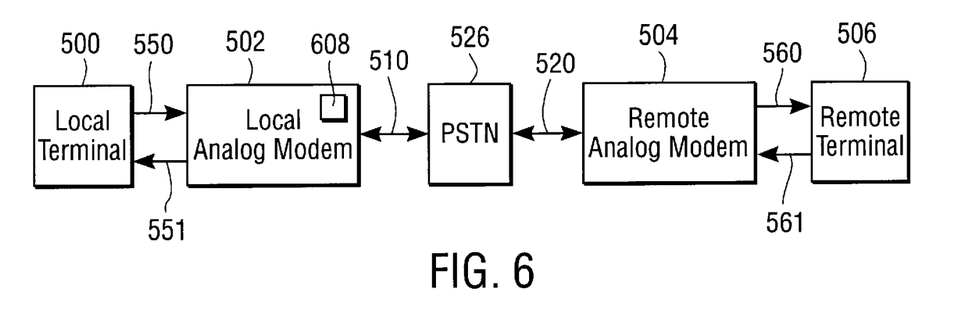
FIG. 6 is a block diagram of an exemplary modem system according to an embodiment of the invention.

An alternative embodiment of the invention is shown in the telecommunications system 500 of FIG. 6. As shown, a local terminal 500, such as a computer, is coupled to a local analog modem 502 via a transmit line 550 and receive line 551. Such transmit and receive lines 550, 551 may be part of an RS-232 interface cable typically employed to couple a computer to a modem. The local analog modem 502 is coupled via a line 510 to the public switched telephone network (PSTN) 526. The line 510 may be a standard twisted pair telephone line which transmits an analog signal. A remote terminal 506, which may also be a computer, is coupled to a remote analog modem 504 via transmit line 561 and receive line 560. The remote analog modem 504 is coupled via line 520 to the PSTN 526. Line 520, like line 510, may also be a standard telephone line. As indicated, the local terminal 500 and local analog modem 502 are arranged to transfer data, information, and other signals between a remote terminal 506 having a remote analog modem 504 over the PSTN 526. Data, including information and command signals, are transferred between the terminals and their respective analog modems over the various respective transmit and receive lines 550, 551, 560, 561. Information from the terminal 500 is modulated and otherwise processed by the local analog modem 502 to form an analog modem signal transmitted to the PSTN 526 over line 510. The analog modem signal is then transferred to the remote analog modem 506 by the PSTN as an analog signal over the line 520.

Within the PSTN, the analog modem signal may be converted to a digital signal (for example, at an exchange or a Central Office (not shown)) for transmission within the network and reconverted to an analog modem signal for transmission over the analog lines 510 and 520 at another exchange or CO. In particular, the digital signal may be a $\mu$-law companded signal (in the United States or Japan) and may be converted in the PSTN 526 to A-law for overseas transmission. Then, the receiving CO or exchange decodes the A-law signal and reconverts it into an analog signal. The remote analog modem 506 demodulates the received analog modem signal and transmits the demodulated data to the remote terminal over line 560. Information from the remote analog modem 506 may also be transmitted to the local analog modem 502 using the same method operating in the opposite or reverse direction.

The analog modems 502, 506 according to the present invention identify the remote destination's companding scheme to determine whether $\mu$-law to A-law (or A-law to $\mu$-law) conversion is necessary. If so, the analog modems 502, 506 adjust the amplitude of their output analog signals to optimize reconversion.

Figure 7:
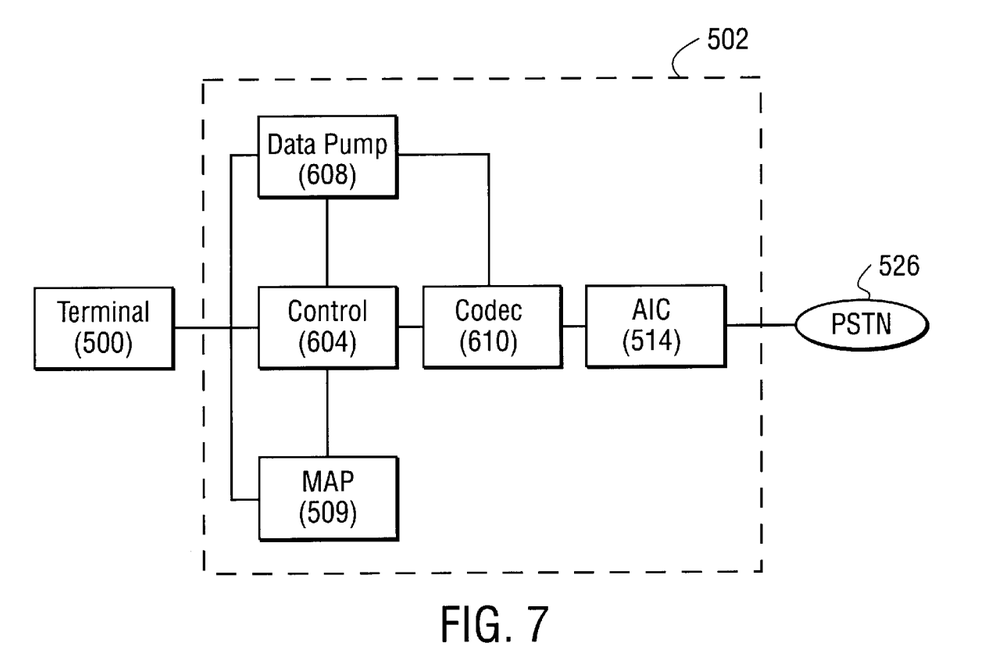
FIG. 7 is a more detailed block diagram of an exemplary modem according to an embodiment of the invention.

FIG. 7 illustrates an analog modem 502 in greater detail, according to an embodiment of the invention. As shown in FIG. 7, an analog modem 502 is coupled to a terminal 500, such as a computer, and transmits and receives data over the PSTN 526 via an analog interface circuit (AIC) or digital access arrangement (DAA) 514. A controller 604 is coupled to the terminal 500. The controller 604 may be a microcontroller and is coupled via a data bus to a data pump 608, which may be a general-purpose digital signal processor programmed as a data pump. A memory 509 is further coupled to the controller 604 and stores a map of $\mu$-law to A-law conversions (and A-law to $\mu$-law conversion)), as will be explained in greater detail below. The data pump 608 receives data, command signals and other information from the controller 604, and then data pump generates a sampled data signal. The data pump 608 is also coupled to a codec 610 which receives the sampled data signal from the data pump 608 and which generates a modulated analog signal from the sampled data signal. The modulated analog signal is then transmitted to the analog interface circuit 514 and out to the PSTN 526. The analog interface circuit 514 provides a variety of functions, such as power level setting, impedance matching, and may include hybrid circuitry to transfer information from two sets of twisted pair transmission lines to one pair of transmission lines.

According to the present invention, the data pump or DSP 608 further determines a conversion of the sampled data signal according to a first encoding law (e.g., $\mu$-law) and, responsive to an indication of whether the destination or remote modem functions within a second encoding law (e.g., A-law), will determine what input to the second encoding scheme will produce an output most closely corresponding to the sampled digital data stream. The sampled digital data stream is then adjusted so that the resulting output of the $\mu$-law encoder will most closely match the closest matching input to the A-law converter. The adjusted digital data stream is then provided to the codec 610 for digital to analog conversion and modulation for transmission along the PSTN. The controller 604 may receive the information concerning the encoding scheme used at the destination in any of several ways. In the case of an incoming call, this information may be derived from standard caller identification information. For example, the terminal 500 receives the caller identification information and may thereafter send a command to the controller 504 indicating that an alternate encoding scheme is used at the remote location. In the case of an outgoing call, this information could be derived from the country code that is provided prior to the local phone number by the terminal 500.

Figure 8:
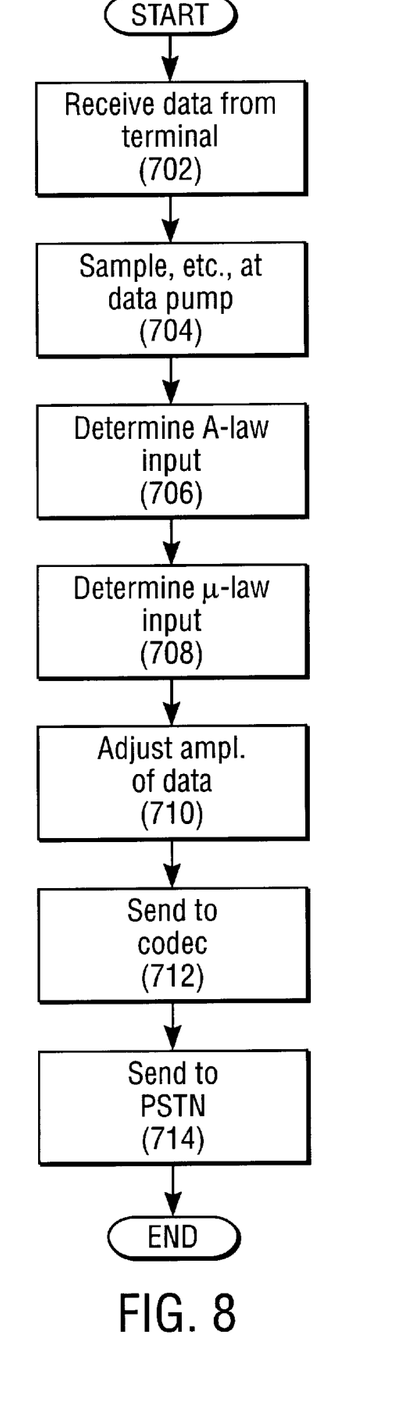
FIG. 8 is a flowchart illustrating operation of an embodiment of the invention.

This process is illustrated in greater detail in FIG. 8, which shows a flowchart of the operation of the modem 502 of FIG. 7 (For simplicity, it will be assumed that the modem 502 is located in a $\mu$-law site). In particular, in a step 702, the modem 502 receives digital data from the terminal 500. As noted above, the terminal 500 may be a computer such as a personal computer. In a step 704, the controller 504 provides the data to the data pump 508, which samples the data. In a step 706, the data pump 508 determines the A-law value that would give the sampled data as an output. That is, the DSP 508 determines what A-law encoding will, if decoded, result in the desired sampled data stream. The data pump 508 does so, for example, by accessing the look-up table in memory 509. In a step 708, the data pump 508 determines what $\mu$-law value will give the corresponding output (i.e., $\mu$-law output). In other words, assuming the A-law value determined in step 706 is equivalent to a $\mu$-law value at the modem 502, the DSP 508 determines what $\mu$-law input would result in that A-law value. In a step 710, the data pump 508 will adjust the data such that the new data corresponds to the determined $\mu$-law value. In a step 712, that stream is sent to the codec 510. Finally, in a step 714, the analog data is sent out the PSTN. It is noted that, while described above in terms of adjusting a digital signal, the amplitude, for example, of the analog signal may similarly be adjusted, in a known manner.

What is claimed is:

1. A telecommunications device, comprising:
    means for determining a conversion of a data signal from a first encoding law to a second encoding law; and
    means for changing a level of said data signal prior to conversion to ensure that a conversion of said data signal to said second encoding law more closely approximates said data signal than if said data signal had been converted without said changing.

2. A telecommunications device, in accordance with claim 1, said first encoding law being either $\mu$-law or A-law, and said second encoding law being the other of $\mu$-law or A-law.

3. A telecommunications device, in accordance with claim 2, said data signal being an analog data signal.

4. A telecommunications device, in accordance with claim 2, said data signal being a digital data signal.

5. A telecommunications device in accordance with claim 2, including means for identifying whether a conversion from said first encoding law to said second encoding law will be required during a communication.

6. A telecommunications device in accordance with claim 5, said identifying means including means for identifying a country code of an input telephone number.

7. A telecommunications device in accordance with claim 5, said identifying means including means for identifying a country code of a received caller identification telephone number.

8. A telecommunications device, comprising:
    a first encoding unit for encoding an input signal according to a first encoding law;
    a converting unit for determining a conversion of said input signal encoded according to said first encoding law to a second encoding law; and
    means for adjusting said input signal so that an output of one or more remote decoding units operating according to said second encoding law is optimized to said input signal.

9. A telecommunications device, in accordance with claim 8, said first encoding law being either $\mu$-law or A-law, and said second encoding law being the other of $\mu$-law or A-law.

10. A telecommunications device, in accordance with claim 9, said input signal being an analog signal.

11. A telecommunications device, in accordance with claim 9, said input signal being a digital signal.

12. A telecommunications device, in accordance with claim 9, including means for identifying whether a conversion from said first encoding law to said second encoding law will be required during a communication.

13. A telecommunications device, in accordance with claim 12, said identifying means including means for identifying a country code of an input telephone number.

14. A telecommunications device, in accordance with claim 13, said identifying means including means for identifying a country code of a received caller identification telephone number.

15. A method of converting a data signal intended to be sent from a first site following a first coding law to a second site following a second coding law different from said first encoding law, said method comprising steps of:
    determining the first coding law at said first site;
    adjusting and encoding said data signal using said first coding law to produce an encoded changed data signal, said adjusting and encoding step ensuring that conversion from said first coding law to said second coding law results in a decoded data signal at said second site being more closely approximated to a normally decoded data signal if said data signal were to be sent from said first site to a third site following said first coding law; and
    transmitting said encoded changed data signal to said second site where said first coding law encoded changed data signal will be converted to said second coding law format and then decoded using said second coding law to a closer reproduction of said data signal at said second site.

16. The method of claim 15 wherein said adjusting and encoding step comprises:
    changing a level of said data signal based on said second coding law to produce a changed data signal; and encoding said changed data signal using said first coding law to produce said encoded changed data signal.

17. The method of claim 15 wherein said data signal comprises a voice signal.

18. The method of claim 15 wherein said data signal comprises a digital data signal.

19. The method of claim 16 wherein said method occurs in a modem.

20. The method of claim 16 wherein said method occurs in a telephony client.

* * * * *